Oct. 18, 1938.  R. J. CLIFTON  2,133,917
PLUG FOR CLOSING HOLES MADE IN MEASURING THICKNESS
Filed March 31, 1936
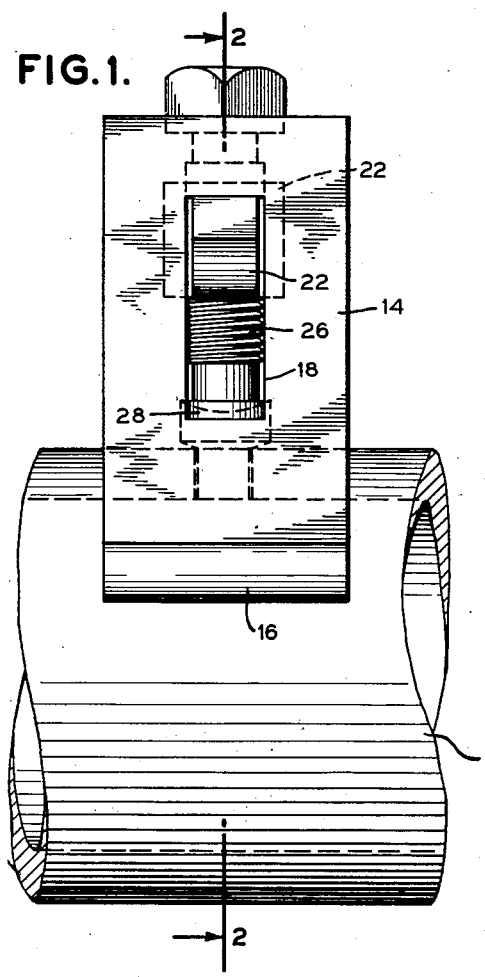
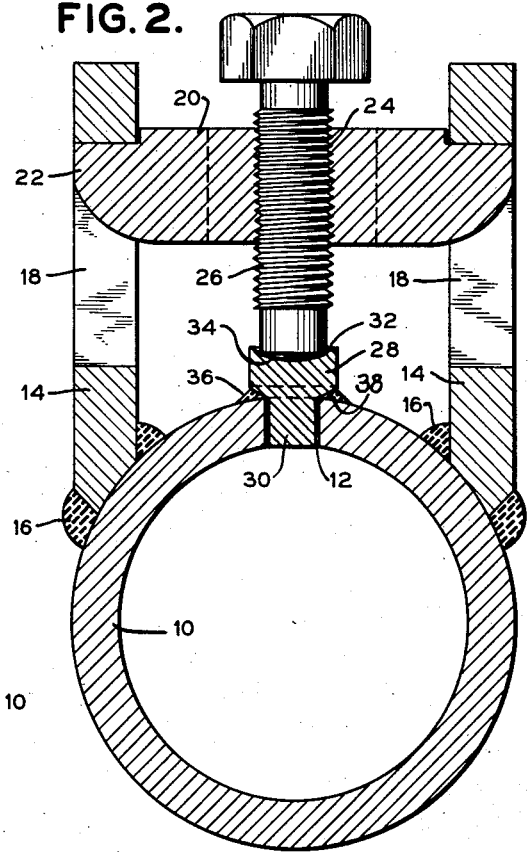
R. J. Clifton
INVENTOR
BY R. J. Dearborn
their ATTORNEY

UNITED STATES PATENT OFFICE 2,133,917

PLUG FOR CLOSING HOLES MADE IN MEASURING THICKNESS

Reginald J. Clifton, Glendale, Calif., assignor to The Texas Company, New York, N. Y., a corporation of Delaware Application March 31, 1936, Serial No. 71,986

2 Claims. (Cl. 220—57)

This invention relates to closure devices and more particularly to plugs for closing holes made in the measurement of the thickness of the walls of liquid receptacles such as tubes, still shells and other vessels. The primary objects of the invention are to provide a simple form of plug which will tightly and firmly close an opening made through a metal wall in the measurement of the thickness of that wall, and which can be easily removed at any time so that additional measurements may be made.

In order to ascertain the amount of corrosion which has taken place on the interior surface of a tube or vessel used in treating certain liquids such as hydrocarbon oils, it has been common to drill holes through the walls of the vessel and after measuring the thickness of the walls by suitable calipers, to screw or otherwise force a plug into the hole and then to weld the plug securely in place. In the regular inspection of a battery of stills it is often necessary to drill and plug a hundred or more holes and with inspections occurring as frequently as every two months, it can readily be seen that the time and expense involved is considerable.

Furthermore, it is obvious that the drilling of a number of holes in close proximity will dangerously weaken a tube or other vessel and in addition will present a very unsightly appearance. It is not uncommon that the wall to be drilled is four or five inches thick and to drill and subsequently plug even one hole in metal of that thickness requires real effort and a large amount of time.

In accordance with this invention a small supporting frame is secured, as by welding, to the outside of the tube or vessel either before or after the hole has been drilled through the wall, and a bolt may then be screwed into the frame to engage and force a small plug into the hole, closing it securely.

For a better understanding of the invention reference may be had to the accompanying drawing in which Figure 1 is an elevation showing one form of closure plug as applied to a section of tubing; and Figure 2 is a sectional elevation on the line 2—2 of Figure 1.

Referring to the drawing, a preferred form of the invention is disclosed in Figures 1 and 2. A section of a pipe or tube 10 which may be used in the heating or other treating of liquids such as hydrocarbon oils is shown as provided with a hole 12 drilled through the tube wall. Suitable calipers or other measuring devices can be inserted through the hole 12 for measuring the thickness of the tube so as to determine the amount of corrosion which may have taken place. A pair of anchoring lug members 14 are secured as by welding at 16 to the outer surface of the tube 10 at opposite sides of the hole 12. The lug members 14 are provided with longitudinal slots 18. A cross bar 20 is adapted to be held normally in the position shown in Figure 2 and for this purpose is provided with reduced end portions 22. The end portions 22 of the bar fit within the slots 18 of the lugs 14 and the bar is thus anchored to the tube 10. The center portion of the bar 20 is provided with a threaded opening 24 adapted to accommodate a threaded bolt 26.

In order to close the hole 12 after a measurement of thickness has been made a plug 28 is used, this plug being provided with a reduced portion 30 which is substantially the same in length as the normal thickness of the wall of the tube 10. When in position the extension 30 fills the hole 12 so that coke or other deposits cannot collect in and obstruct the hole. The end of the plug 28 opposite the extension 30 is provided with a concave face 32 and the end of the bolt 26 is provided with a convex face 34 having the same curvature as the concave face 32.

When it is desired to close the hole 12 the extension 30 of the plug 28 is placed in the hole and the cross bar 20 is then placed in position between the anchoring lugs 14. The bolt 24 is threaded through the bar 20 until the end of the bolt engages the plug 28 and by further tightening the bolt in the bar 20 the plug 28 will be forced firmly against the outer rim of the hole 12 and will be securely held in that position against the pressure of the liquids within the tube 10. The curved faces 32 and 34 of the plug and bolt comprise a spherical joint which will insure the plug being held tightly in the hole 12 regardless of any slight irregularity in the position of the bolt 26 and the cross bar 20. If desired, the outer rim of the hole 12 can be slightly built up with welded metal 36 to form a better seat for the plug 28 and it is preferred that the lower surface 38 of the outer portion of the plug be spherical so as to provide a ball joint between the plug and the tube. The welded metal 36 can, of course, be omitted and the ball joint made directly on the face of the tube.

It can be seen that with this invention one hole can be drilled through any portion of the wall of a tube or other vessel where corrosion is likely to occur and this hole can be used in the measuring of the thickness of the wall any number of times by merely unscrewing or removing the plug from the hole. Obviously, this will save a great amount of time in the periodical measuring of the wall thickness and it will also obviate the weakening of the tube or vessel which would occur if several holes were drilled through the wall in close proximity to each other.

In place of the ball or spherical joint shown in Figure 2 between the plug 28 and the tube 10 other forms such as a tapered joint could be likewise used. Likewise, instead of using two anchor members 14 welded to the tube or vessel as shown in Figure 2, a U-shaped strap could be placed around the tube, the strap being provided with slots similar to those shown at 18 and adapted to cooperate with a suitable cross bar.

Obviously many modifications of the invention may be made without departing from the spirit and scope thereof, and it is intended that there be no limitation except as imposed by the appended claims.

I claim:

1. In a device for closing a hole in the wall of a metallic vessel, a pair of anchor lugs secured to the outer surface of said wall at opposite sides of said hole, a cross bar having means at its ends for engaging said lugs and provided with a center threaded opening normally in alignment with the hole in said wall, a plug adapted to cover and close said hole, a threaded bolt adapted to be screwed through the opening in said bar so that one end of the bolt will engage and force said plug into engagement with said wall to close said hole, and a spherical joint between said bolt and said plug.

2. In a device for closing a hole in the wall of a metallic vessel, a pair of anchor lugs secured to the outer surface of said wall at opposite sides of said hole, said lugs being provided with aligned longitudinal slots, a cross member having ends adapted to engage the slots in said frame members and provided with a threaded center opening normally in alignment with the hole in said wall, a plug for closing the hole in said wall and having at one end an extension adapted to fit within and substantially fill said hole, said plug being provided at its other end with a concave face, and a threaded bolt adapted to be screwed through the opening in said cross member and provided at one end with a convex face, the arrangement being such that when said bolt is screwed through said cross member the convex face of said bolt will engage the concave face of said plug to force said plug into the hole in the wall of said vessel.

REGINALD J. CLIFTON.